Dec. 14, 1943.   H. C. STEARNS   2,336,759
ELECTRIC GENERATOR
Filed Feb. 9, 1942
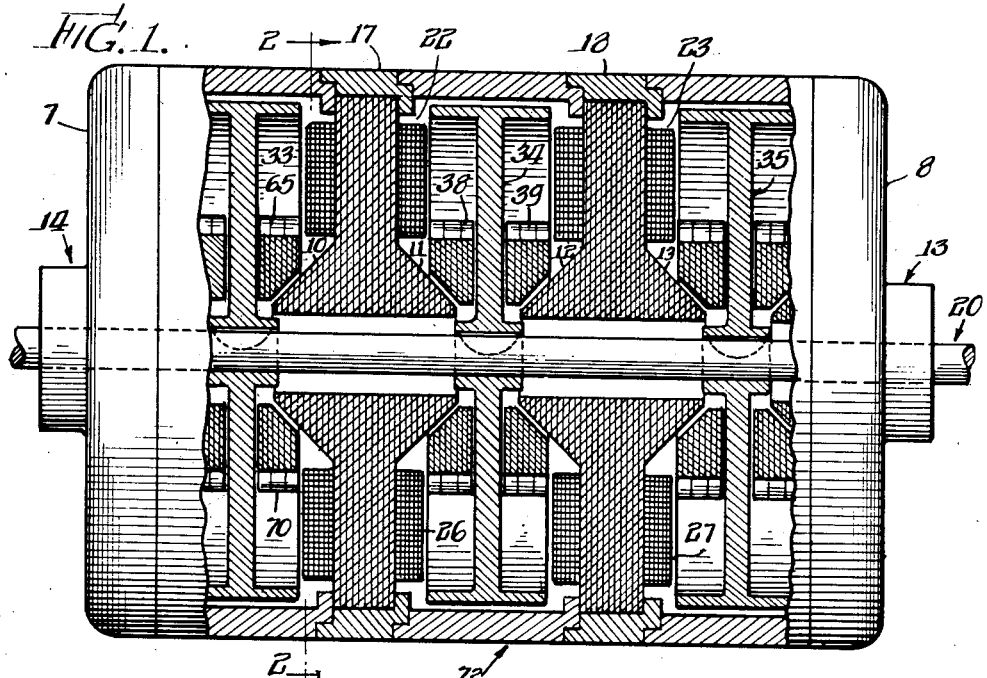
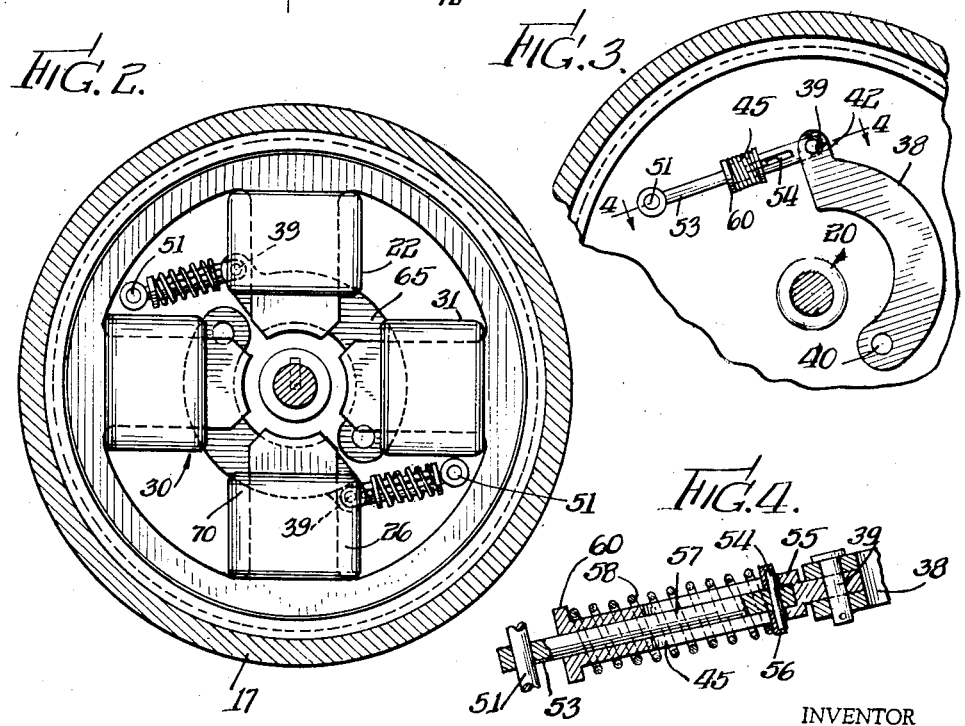
INVENTOR
Harry C. Stearns Patented Dec. 14, 1943

2,336,759

UNITED STATES PATENT OFFICE 2,336,759

ELECTRIC GENERATOR

Harry C. Stearns, Glen Ellyn, Ill.

Application February 9, 1942, Serial No. 430,051

5 Claims. (Cl. 171—119)

This invention relates to electric generators of the inductor type.

Electric generators of the inductor type are known in the art. They are constructed, for example, of rotating conductors in magnetic fields with collector rings and brushes for external delivery of alternating current, with rotating conductors in magnetic fields connected to commutator bars for external delivery through brushes of direct current, and with rotating members intermittently provided with magnetically susceptible laminated members, which build up and break down magnetic flux supplied to one stationary magnetic member, surrounded by conductors, for current generation, by another magnetic member surrounded by conductors carrying direct current for exciting this member.

In most of the conventional arrangements, generators are driven at constant speed by reciprocating steam engines, steam turbines, or Diesel engines, with governors to maintain constant speed regardless of load. In some applications where generators are driven from prime movers used mainly for other purposes such as automobile, truck, tractor, tank, or aircraft engines, variable engine speed makes it difficult to drive the generator at a constant speed. It has been general practice in these last mentioned generator systems, used mainly for battery charging and for supplying headlights or other moderate current requirements to drive the generators by the variable speed engine through fan belts or the like. This affords a rather satisfactory drive for certain of the purposes stated. However, control of the generator voltage, as the speed and load changes, requires elaborate equipment, such as generator relays which cut out the generator exciting current as the voltage increases above a given value, and which increase the exciting current as the voltage decreases below a given value.

Where higher A. C. voltages are employed, close enough control is very difficult to obtain by methods previously used.

Rectification of the alternating current generated in the windings of the generator, when the current is to be immediately used for lighting, heating, or energizing certain types of motors, requires equipment which is not needed because alternating current is just as useful for these purposes, and is even preferable since it can be transformed. A substantially greater amount of electrical energy, which may be in the form of alternating current, is required for electric heating in winter and for driving mechanical refrigeration machines for cooling in summer than is required, in the form of direct current, for battery charging only.

In applications such as these, generators employing stationary windings of a design to be disclosed herein afford excellent solutions to these problems. In their design, radial stationary poles are provided, with rotors carrying stacks of laminated magnetic material of high permeability so arranged that these magnetic members as they rotate build up and break down the flow of magnetic flux from exciting poles through generating poles and reverse the direction of flow of flux periodically. The magnetic members are mounted on rotor plates under spring tension permitting said magnetic members to move outwardly with increased rotor speed, by action of centrifugal force, and thereby so increase the air gaps between poles as to reduce the flux densities, at increased rotor speeds, sufficiently to correct for the increased voltage which would otherwise be produced at the increased rotor speed.

With this arrangement a relay or relays having a low resistance coil or coils could be connected in series with the output circuits to cut in or out assisting coils on exciting poles of the generator as the demand increases or decreases and thereby maintain the voltage constant regardless of load, or other suitable excitation control. The combination of these two arrangements inherently corrects for voltage changes which otherwise would be caused by changes in the speed of the rotor of the generator and also corrects for voltage drop at constant speed when loads change. The combination of these two arrangements serves ideally to maintain constant voltage for many applications, for example, for lighting, heating and series motor applications, for supplying large amounts of electrical energy from small generators driven in the manner described, and the frequency of the A. C. is not a factor. Where higher voltages may be conveniently applied because of heavier loads, such as voltages of 110 v., suitable transformers could in many cases be used (if the frequency range be not too wide, or the voltage requirements too close) for stepping portions of the delivered current down to the lower voltage required for battery charging. Dry disc rectifier or rectifiers could be used to rectify a sufficient amount of this current for battery charging requirements. Any other type of suitable rectifier could be used in conjunction with this arrangement, such as that disclosed in my co-pending application, Serial No. 430,048, filed February 9, 1942.

One manner in which this generator may be constructed will be better understood by reference to the accompanying drawing which forms a part of this specification and in which Figure 1 is a plan view of the generator, partly in section;

Figure 2 is a section taken along the line 2—2 of Figure 1;

Figure 3 illustrates in section a portion of the drive plate and centrifugally controlled flux regulator member;

Figure 4 is a view in section taken along the line 4—4 of Figure 3.

In Figure 1, 7 and 8 are end bells supporting roller or ball bearings in cages 13 and 14. These end bells 7 and 8 are aligned with cylindrical parts 17 and 18 by flanges machined in their surfaces as shown so as to locate the magnetic surfaces of the stationary poles 10, 11, 12, 13, etc., very closely to the axis of the shaft 20 which is supported by the aforesaid bearings in cages 13 and 14. The coils 22 and 23 are wound about stationary members having magnetic surfaces 10 and 11, 12 and 13, and are connected to direct current exciting sources, as are coils 26 and 27. Coils 30 and 31 shown in Figure 2 are generating coils which are connected together either in series or shunt to provide alternating electric current. The drive discs 33, 34 and 35 resemble pulleys or sheaves and are mounted on the central driving shaft 20 in a manner to hold close alignment in their central planes as well as close radial location and are checked for dynamic balance, with the flux controlling members and spring control units mounted thereon, at various speeds, before being assembled to the generator. Mounted on these discs or pulleys are stacks of laminated magnetically susceptible material shown as 38 and 39 in Figure 1 and as 38 in Figure 3. The mounting shown in Figure 3 includes a pivot pin 40 integral with the disc or pulley about which the end 42 may move outwardly against the restraining member 45 which is constructed as shown in detail in Figure 4. Figure 4 shows the restraining member 45 in the unloaded condition but capable of restraining or controlling the outward movement of the member 38 under the centrifugal force to which the member is subjected when it revolves about the axis of shaft 20. In Figure 4, 51 is a support pin in the disc to which support arm 53 is attached as shown. 55 is a support sleeve anchored pivotally to a magnetic member 38 by pin 39 as shown. 56 is a thrust washer against which the spring 58 presses to communicate the load to the pin 54 which passes through the slot 57 in the sleeve 55 and also through a closely fitting hole in 53. The spring 58 also bears against thrust collar 60 which is integral with sleeve 55. As the member 38 tends to move outwardly away from central shaft and the stationary pole faces shown as 10, 11, 12, 13, etc., the relative movement of the sleeve 55 with respect to the pin 53, compresses the spring 58 and thereby increases the force exerted tending to retard the outward movement of magnetic member 38. In Figures 1 and 2, 65 and 70 show two centrifugal flux controlling members as they would be mounted opposite each other on the discs to simultaneously and uniformly control the flux changes in the opposite pairs of poles. 72 is one of a number of spacing rings which are used in the stacking of the stages shown and are made with closely finished flanges to provide close alignment of all stationary parts in stacking. Springs are selected to afford the proper spring rate to permit the magnetically susceptible flux controlling members, as 38 in Figure 3, to move outwardly the desired degree for a given increase in rotational speed of the revolving discs 33, 34 and 35 to maintain a constant voltage at rated load, as rotational speeds increase above the minimum rotational speed. Current coils may be shunted together when stages are properly synchronized or all generating coils under these same conditions may be connected in series to afford high voltage delivery of the same frequency from all stages. The generator may be constructed with generating poles 120° apart in three stages to afford three phase current, for even though the frequency of the currents may vary all currents will be of the same frequency at any one time. This may be done in a manner similar to that disclosed in my co-pending application, Serial No. 430,050, filed February 9, 1942. A rectifying commutator may be mounted on the end of the shaft 20, preferably externally, to rectify a part or all of said current in a manner similar to that disclosed in my co-pending application, Serial No. 430,048, filed February 9, 1942; or a dry disc rectifier or other suitable rectifier may be used to rectify all or a part of the delivered current.

I have described the invention in connection with the details of a particular embodiment, but I do not intend thereby to limit the invention to such details, nor do I intend to be limited to the particular relation of the essential features shown and described, nor to the particular use to which the generators are put.

The invention is hereby claimed as follows:

1. An inductor generator comprising stationary exciting poles, stationary generating poles with windings, a rotor carrying an inductor, including members of laminated material of high permeability, across the magnetic lines of force linking the stationary exciting and generating poles, means for pivoting said members to said rotor for movement relative thereto on rotation of the rotor to vary the distribution of said magnetic lines of force as said inductor moves across said lines, and means for controlling the movement of said members relative to said rotor in accordance with the speed of the rotor.

2. An inductor generator comprising a series of stationary field pole pieces of magnetically susceptible material, windings on said pieces for magnetically exciting said field pole pieces and causing alternate ones of said pole pieces to be of opposite polarity, magnetically susceptible armature pole pieces between said field pole pieces, armature coils on said armature pole pieces to generate current for electrical use, rotatable inductor members of magnetically susceptible material for interlinking each armature pole piece alternately with the adjacent field pole pieces of opposite polarity, a rotor, said inductor members being mounted on said rotor for movement relative thereto under centrifugal force to vary the degree of interlinking of each armature pole piece with adjacent field pole pieces, and means for controlling the movement of said members relative to the rotor in accordance with the speed of the rotor.

3. An inductor generator comprising a rotor, a series of radially extending pole pieces equally spaced angularly about the axis of the rotor, exciting field windings and excited generating windings on alternate pole pieces, a member secured to said rotor for rotation therewith and having a surface extending radially therefrom in axially spaced relation to said pole pieces, a plurality of inductor elements of laminated, magnetically susceptible material, means for pivotally connecting one end of each of said elements on said radial surface of said member for radial movement relative thereto as the member rotates, said elements comprising segments of sufficient arcuate length to extend between the remote edges of adjacent pole pieces and thereby effect periodical reversal of the direction of the flow of flux through the generating windings, said mounting means including a resilient connection between the other end of each of said elements and said member to control the radial movement of said elements in accordance with the speed of the rotor whereby to vary the amount of flux flowing through said generating windings as the speed of the rotor varies.

4. An inductor generator comprising a rotor, a plurality of pole pieces of laminated material of high magnetic permeability, said pole pieces being arranged in a plurality of stages spaced axially of the rotor and having different numbers of pole pieces per stage to afford different electrical frequencies, a plurality of sets of inductors, one set for each of said stages, and each comprising a plurality of segmental laminations of magnetically susceptible material, means for mounting said elements on said rotor for movement radially thereof under centrifugal force, said mounting means being constructed to position each set in close but axially spaced juxtaposition to the pole pieces of the associated stage, exciting field windings and excited generating windings on alternate pole pieces of each stage, said segmental inductor elements being of sufficient arcuate length to extend between the remote ends of adjacent pole pieces of the stage with which said elements are associated, said mounting means including spring means connecting said elements to said rotor to control the radial movements of said elements in accordance with the speed of the rotor.

5. An inductor generator comprising a rotary shaft, a plurality of stationary, laminated pole pieces of magnetic material and spaced angularly about said shaft and each extending radially relative to the shaft, exciting field windings and excited generating windings on alternate pole pieces, the inner ends of said pole pieces extending radially and axially beyond said windings, a member secured to said rotor in axial juxtaposition to said pole pieces, a plurality of inductors each comprising a plurality of segmental laminations of magnetically susceptible material, means for mounting said inductors on the radial surface of said member in angularly spaced relation and in positions overlying the inner ends of the pole pieces that extend beyond the windings, said mounting means comprising means for pivoting the laminations of each inductor to the surface of said member for radial movement relative thereto under centrifugal force as said member and rotor rotate, and said mounting means including a resilient connection between the other ends of the laminations of each inductor and said member for controlling the radial movement of said inductor laminations in accordance with the speed of rotation of said member and rotor.

HARRY C. STEARNS,